(12) United States Patent
Herzog et al.

(10) Patent No.: US 10,471,701 B2
(45) Date of Patent: Nov. 12, 2019

(54) POWDER MODULE FOR AN APPARATUS FOR ADDITIVE MANUFACTURING OF THREE-DIMENSIONAL OBJECTS

(71) Applicant: CL SCHUTZRECHTSVERWALTUNGS GMBH, Lichtenfels (DE)

(72) Inventors: Frank Herzog, Lichtenfels (DE); Frank Schödel, Kronach (DE); Florian Bechmann, Lichtenfels (DE)

(73) Assignee: CL Schutzrechtsverwaltungs GmbH, Lichtenfels (DE)

( * ) Notice: Subject to any disclaimer, the term of this patent is extended or adjusted under 35 U.S.C. 154(b) by 52 days.

(21) Appl. No.: 15/663,373

(22) Filed: Jul. 28, 2017

(65) Prior Publication Data

US 2018/0029348 A1 Feb. 1, 2018

(30) Foreign Application Priority Data

Jul. 29, 2016 (DE) .................. 10 2016 114 053

(51) Int. Cl.
| | |
|---|---|
| *B29C 64/255* | (2017.01) |
| *B33Y 50/02* | (2015.01) |
| *B33Y 10/00* | (2015.01) |
| *B33Y 30/00* | (2015.01) |
| *B33Y 40/00* | (2015.01) |

(52) U.S. Cl.
CPC ............ *B33Y 50/02* (2014.12); *B29C 64/255* (2017.08); *B33Y 10/00* (2014.12); *B33Y 30/00* (2014.12); *B33Y 40/00* (2014.12)

(58) Field of Classification Search
CPC ............................ B29C 64/255; B29C 64/259
See application file for complete search history.

(56) References Cited

U.S. PATENT DOCUMENTS

| | | | |
|---|---|---|---|
| 6,561,451 B1 | 5/2003 | Steinich | |
| 8,845,316 B2 * | 9/2014 | Schillen | ............ B29C 64/393 425/149 |
| 9,943,907 B2 | 4/2018 | Hess et al. | |

(Continued)

FOREIGN PATENT DOCUMENTS

| | | |
|---|---|---|
| DE | 102012014840 A1 | 1/2014 |
| EP | 2913176 A1 | 9/2015 |

(Continued)

OTHER PUBLICATIONS

Translation of Second Chinese Office Action, CN Application Number: 201710632475.6, dated Aug. 1, 2019 (Year: 2019).*

(Continued)

*Primary Examiner* — Timothy Kennedy
(74) *Attorney, Agent, or Firm* — Dority & Manning, P.A.

(57) ABSTRACT

A powder module (1) for an apparatus for additive manufacturing of three-dimensional objects, comprising a powder chamber (2) limiting a powder room (3) that can be filled with powdered construction material, a carrying device (4) arranged in the powder room (3), limiting the powder room (3) at the bottom, movably supported relative to the powder chamber (2), and a position detection device (6), which is provided for the detection of the position of the carrying device (4), wherein the position detection device (6) is formed as or at least comprises a cable pull sensor.

20 Claims, 2 Drawing Sheets

(56) References Cited

U.S. PATENT DOCUMENTS

| | | | |
|---|---|---|---|
| 2007/0037509 A1* | 2/2007 | Renz | B29C 64/153 |
| | | | 454/354 |
| 2013/0168902 A1* | 7/2013 | Herzog | B29C 64/386 |
| | | | 264/401 |
| 2015/0246414 A1* | 9/2015 | Hess | B29C 64/165 |
| | | | 219/76.14 |
| 2016/0297141 A1* | 10/2016 | El-Siblani | B29C 64/135 |
| 2017/0129011 A1 | 5/2017 | Murata et al. | |
| 2019/0105841 A1* | 4/2019 | Zamorano | B29C 64/393 |

FOREIGN PATENT DOCUMENTS

| | | |
|---|---|---|
| JP | H03117712 U | 12/1991 |
| JP | H0726760 A | 1/1995 |
| JP | H09119831 A | 5/1997 |
| JP | 2015155188 A | 8/2015 |
| WO | WO2015194398 A2 | 12/2015 |

OTHER PUBLICATIONS

Translation of Second Japanese Office Action, JP Application Number: 2017-145091, dated Jun. 18, 2019 (Year: 2019).*

SIKO, "Wire-actuated encoder SGH10, Direct stroke measurement in the hydraulic cylinder", Apr. 5, 2016, https://www.siko-global.com/adbimage/28056/asset_original/data-sheet-sgh10.pdf (retrieved May 9, 2017).

European Search Report U.S. Pat. No. 17172789.4 dated Jan. 3, 2018.

Second Chinese Office Action, CN Application No. 201710632475.6, dated Aug. 1, 2019, 5 pages.

Second Japanese Office Action, JP Application No. 2017-145091, dated Jun. 18, 2019, 2 pages.

* cited by examiner

POWDER MODULE FOR AN APPARATUS FOR ADDITIVE MANUFACTURING OF THREE-DIMENSIONAL OBJECTS

CROSS-REFERENCE TO RELATED APPLICATIONS

This application claims priority to German Patent Application serial no. 10 2016 114 053.8 filed Jul. 29, 2016, the contents of which is incorporated herein by reference in its entirety as if set forth verbatim.

The invention relates to a powder module for an apparatus for additive manufacturing of three-dimensional objects, comprising a powder chamber limiting a powder room that can be filled with powdered construction material, a carrying device arranged in the powder room, limiting the powder room at the bottom, movably supported relative to the powder chamber, and a position detection device provided for the detection of the position of the carrying device, especially relative to the powder chamber.

Such powder modules, for example in the form of construction or metering modules, are known as functional components of apparatuses for additive manufacturing of three-dimensional objects. In respective powder modules, an accurate detection of the position of the carrying device (typically the position of the carrying device relative to the powder chamber) is purposeful or required.

If at all present, previous position detection devices provided to detect the position of the carrying device are in need of further development or improvement. This especially applies to the detection of the position of the carrying device at comparatively long (high) traveling distances.

The invention is based on the object of providing, in contrast to the above, especially in terms of an accurate detection of the position of the carrying device, an improved powder module for an apparatus for additive manufacturing of three-dimensional objects.

The object is solved by a powder module for an apparatus for additive manufacturing of three-dimensional objects according to claim 1. The dependent claims relate to possible embodiments of the powder module.

The powder module described herein represents a functional component of an apparatus for additive manufacturing of three-dimensional objects. A respective apparatus is provided for additive manufacturing of at least one three-dimensional object (hereinafter, in short, referred to as "object") by successive, selective layer-by-layer exposure and thus solidification of individual construction material layers of a powdered construction material (hereinafter, in short, referred to as "construction material") that can be solidified by means of at least one energy beam. The construction material can be metal powder, plastic powder and/or ceramic powder. Metal powders, plastic powders or ceramic powders can also be interpreted to include a powder mixture of different metals, plastics or ceramics. The energy beam can be a laser beam. The apparatus can correspondingly be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module can generally be any powder module, which is provided for receiving and/or dispensing construction material. In particular, the powder module can be a construction module in which the actual additive construction of three-dimensional objects is performed and which, for this purpose, is filled with construction material to be solidified in a successive, selective layer-by-layer manner when performing additive manufacturing processes, a metering module via which, when performing additive manufacturing processes, construction material is metered out into a process chamber successively and in layers, or a collector module which, when performing additive manufacturing processes, is filled with construction material that is not solidified.

The powder module comprises a powder chamber. The powder chamber limits a powder room that can be filled with construction material. The powder room is limited at least on the side by walls (powder chamber walls) of the powder chamber generally formed like a hollow parallelepiped or like a hollow cylinder. At the bottom, the powder room is limited by a carrying device. The carrying device is typically movably supported between two end positions, i.e. between an upper end position (related to the height of the powder module) and a lower end position, relative to the powder chamber. The movable support of the carrying device enables the realization of especially linear movement of the carrying device along a vertical movement axis or in a vertical movement direction. The movable support of the carrying device is typically realized by an especially (electro) motor operated drive or actuator device coupled with the carrying device.

To detect the position of the carrying device, the powder module comprises a position detection device. The position detection device is generally provided to detect the position of the carrying device. In particular, the position detection device is provided to detect the position of the carrying device in its respective end positions, i.e. especially to detect the upper end position of the carrying device. The position of the carrying device can be detected relative to a component of the powder module, i.e. especially relative to the powder chamber. It is significant to the position detection device that it is formed as or at least comprises a cable pull sensor (cable pull length sensor). The use of at least one cable pull sensor to detect the position of the carrying device enables an accurate and reliable detection of the position of the carrying device. As explained further below, this especially also applies to large moving distances of the carrying device.

Consequently, especially in terms of an accurate detection of the position of the carrying device, an improved powder module for an apparatus for additive manufacturing of three-dimensional objects is provided.

The cable pull sensor can comprise a housing element or part arranged in a fixed position relative to the powder chamber, an especially cable-like pull-out element ("pull-out cable") that can be or is coupled with the carrying device, and a detection device provided to detect the pull-out length of the pull-out element. The housing element limits a receiving or interior room, which is provided to receive various functional components of the cable pull sensor. In the receiving room next to the detection device typically a, e.g. winch-like, spooler is located, on which the pull-out element is attached on one side and from which the pull-out element can be unwound. The pull-out element can (regarding its length) extend at least partially exposed and is thus well-accessible and/or can (regarding its length) extend at least partially surrounded by a sleeve-like or eye-like portion and is thus protected between the housing element and the carrying device.

Movements of the carrying device result in changes of the pull-out length of the pull-out element; a movement of the pull-out element coupled with the carrying device that can be traced back to a movement of the carrying device causes a rotational movement of the spooler around a rotational axis. The detection device detects respective rotational movements of the spooler; for this purpose, the detection device can comprise a suitable evaluation unit (sensor unit) that is implemented by hardware and/or software, consequently an electronic device, which is provided to evaluate or convert the detected pull-out length of the pull-out element in terms of a position of the carrying device. The evaluation can be performed depending on the specific design of the evaluation unit e.g. (photo)electrically, optically, potentiometrically, etc.

The housing can be arranged or formed on a connecting component arranged or formed in the section of a lower end of the powder chamber. This is an especially compact and, e.g. for the sake of service or repair, easily accessible option of the arrangement of the housing element, which does not change the dimensions of the powder module relevant for the arrangement of the powder module in an apparatus for additive manufacturing of three-dimensional objects. The connecting component can be an angle element with multiple legs, i.e. e.g. an L-shaped angle element, a first leg of which serves for attaching the connecting component to the powder module, especially the powder chamber, and another leg serves for attaching the housing element to the connecting component. The connecting component can, e.g. by means of a screw fastening, be detachably attached to the powder module, especially the powder chamber, (in a damage-free and non-destructive manner).

The carrying device can comprise a table-like base body and at least one, especially several, plate-like or plate-shaped supporting bodies arranged or formed on the base body in a stacked-like manner. Respective supporting bodies can be functionalized in different ways. Respective supporting bodies can e.g. be a construction plate, a heater and a (thermal) insulating body. Between directly adjacent supporting bodies, sealing elements can at least partially be arranged or formed. The pull-out element associated with the cable pull sensor is typically attached to the base body, but not necessarily. The pull-out element can e.g. be attached in a form-locked or force-locked manner, i.e. by means of a hook fastening, clamp fastening, squeeze fastening or a screw fastening, to the base body or the carrying device.

The position detection device can comprise several cable pull sensors. The provision of several cable pull sensors enables redundant detection of the position of the carrying device such that position detection is also possible when one cable pull sensor fails. Similarly, by means of several cable pull sensors possibly undesired changes of the orientation of the carrying device, i.e. for example inclinations, can be detected; this would e.g. be the case when different cable pull sensors detect different positions of the carrying device. The positions of the carrying device detected by means of respective cable pull sensors can be evaluated together with the appropriate configuration of the evaluation unit associated with the detection device, e.g. by averaging.

The maximum moving distance (lifting) of the carrying device can be between 800 and 1200 mm, especially between 950 and 1050 mm. The use of appropriate cable pull sensors enables an accurate detection of the position of the carrying device even with respectively large liftings.

Appropriately large liftings of the carrying device require a powder chamber that is formed appropriately high. Therefore, the powder chamber or a powder chamber base body limiting the powder room can be formed segmented. The powder chamber base body can be formed segmented into several powder chamber base body segments that can be or are attached to each other forming the powder chamber base body. By arranging respective powder chamber base body segments like stacks, principally powder chambers of any height and hence any heights of construction can be realized. The segmentation is relevant especially for the design of the powder module as a construction module.

The segmentation of the powder chamber base body into the powder chamber base body segments is performed depending on the number of the powder chamber base body segments in at least one, possibly more, segmentation planes. A respective segmentation plane can basically be anywhere in the room; respective powder chamber base body segments can principally be arranged in horizontal and/or vertical orientation. Segmentation planes inclined in relation to a horizontal or vertical reference plane are also principally imaginable.

The respective powder chamber base body segments in its geometric structural dimensions are selected such that they can each be manufactured in one production step. The so far problematic manufacturing of comparatively high powder or construction chambers, i.e. especially powder chambers the powder room of which exceeds a maximum height of at least 500 mm, i.e. possibly having 1000 mm or more, with the requested narrow tolerances is hence addressed by a segmentation of the powder chamber into several powder chamber base body segments that can be attached or are attached to each other in the assembly state of the powder chamber forming the powder chamber base body.

With the possibility of attaching respective powder chamber base body segments to each other, powder chambers of any height can basically be formed. Of course, this also applies to the case of the stack-type vertical arrangement or attachment of respective powder chamber base body segments on top of each other. From this it follows that the powder chamber base body is formed segmented preferably in at least one horizontal segmentation plane, wherein the respective powder chamber base body segments when segmenting in the horizontal segmentation plane can be attached or are attached on top of each other in vertical or vertical adjacent arrangement.

The respective powder chamber base body segments can have a (hollow) parallelepiped, hollow cylindrical or an annular disk-shaped base shape. Hence, the powder chamber base body segments each comprise an interior room limited by the walls of the respective powder chamber base body segments, defined by the respective base shape thereof. The respective interior room of the powder chamber base body segments (in the assembly state of the powder chamber) forms a part of the powder room. Hence, each powder chamber base body segment typically limits one powder room portion describing an entire inner circumference of the powder room.

Basically, the powder chamber base body segments can be formed identically in terms of geometric structure or can be formed such that they differ in at least one geometric-structural parameter, especially the respective height thereof. In geometric structural terms, the powder chamber can hence comprise (several) identical powder chamber base body segments or (several) different powder chamber base body segments. The geometric structural dimensions of the respective powder chamber base body segments can be selected especially in terms of the realization of a certain desired height of the powder chamber or the powder room.

For attachment—the attachment can typically be detached (in a damage-free and non-destructive manner)—of powder chamber base body segments that can be or are attached to each other to form the powder chamber base body at least one attachment element can be arranged or formed on each powder chamber base body segment. The respective attachment elements are provided to interact by forming a (detachable) attachment of at least two powder chamber base body segments that are to be connected or that are connected to form the base body. The respective attachment elements can be provided to interact by forming an attachment of at least two powder chamber base body segments that are to be connected or that are connected to form the base body in a form-locked and force-locked manner. This is especially understood to mean that the respective attachment elements are provided to interact with each other by forming a form-locked and/or force-locked connection or are provided to form such a connection.

In respective attachment elements these can hence possibly be corresponding form-locked elements provided to interact with each other by forming a form-locked connection or provided to produce such a connection, or possibly corresponding force-locked elements provided to interact with each other by forming a force-locked connection or provided to produce such a connection. Respective form-locked elements can specifically be formed e.g. as a projection and hence (corresponding) receiver or recess. Consequently, by interaction of corresponding form-locked elements, e.g. a tongue-and-groove-joint or a connection of such a type can be formed. Respective force-locked elements can specifically be formed as bolts or alignment pins and hence (corresponding) receivers or recesses possibly provided with a mating thread. Consequently, by interaction of corresponding force-locked elements, e.g. a bolt or alignment pin-connection or a connection of such a type can be formed.

For that option, according to which the respective attachment elements are provided, to interact by forming a fastening of at least two powder chamber base body segments that are to be connected or are connected to each other for forming the base body in a force-locked manner, it is imaginable that the attachment elements are formed as at least attachment receivers or recesses that at least partially can be penetrated by a, especially bore-like, attachment bolt, and are penetrated by a corresponding attachment bolt in the status of being attached to each other at least partially. An attachment bolt can be a threaded bolt or a stud bolt. An attachment receiver or recess of a first powder chamber base body segment is formed as a through-hole, an attachment receiver or recess of a second powder chamber base body segment to be connected with the first powder chamber base body segment can be formed as a blind hole. In order to handle respective powder chamber base body segments in any way, each powder chamber base body segment can be provided in the section of an (upper) first edge portion with a through-hole, and in the section of a (lower) first edge portion arranged or formed opposite said through-hole with a blind hole.

Respective attachment receivers or recesses can be arranged or formed in a (cross-sectionally seen) tapered recess section of the respective powder chamber base body segment such that they do not extend the outer dimensions of the respective powder chamber base body segment or the entire powder chamber.

The powder chamber base body segments are typically metal components manufactured by machining, especially milling, operations. Manufacturing the powder chamber base body segments by wire eroding or wire cutting is also imaginable.

The metal material forming the powder chamber base body segments can be a light metal, especially aluminum or an aluminum alloy. In addition to the comparatively low weight, light metals are characterized by a comparatively simple machinability when it comes to manufacturing.

The geometric structural dimensioning of the powder chamber or the powder room is purposefully designed for additive manufacturing of comparatively large or elongated components or component structures ("large-scale structures"). These can e.g. be components of a motor vehicle, i.e. vehicle body structures like door structures. Therefore, the powder room can e.g. have a maximum depth of 1400 mm, especially in a range between 800 and 1200 mm. Here, of course, upwards and downwards exceptions are possible.

In addition to the powder module, the invention also relates to an apparatus for additive manufacturing of three-dimensional objects. The apparatus, which especially is an SLS apparatus or an SLM apparatus, is characterized in that it comprises at least one powder module as described. All embodiments in connection with the powder module thus analogously apply to the apparatus.

The invention is explained in more detail by means of an exemplary embodiment in the figures of the drawings. In which:

FIG. 1 shows a schematic diagram of a powder module 1 according to an exemplary embodiment in a (longitudinal) sectional view. FIG. 2 shows an enlarged illustration of the individual unit C shown in FIG. 1 in a partially broken view.

Figure 1:
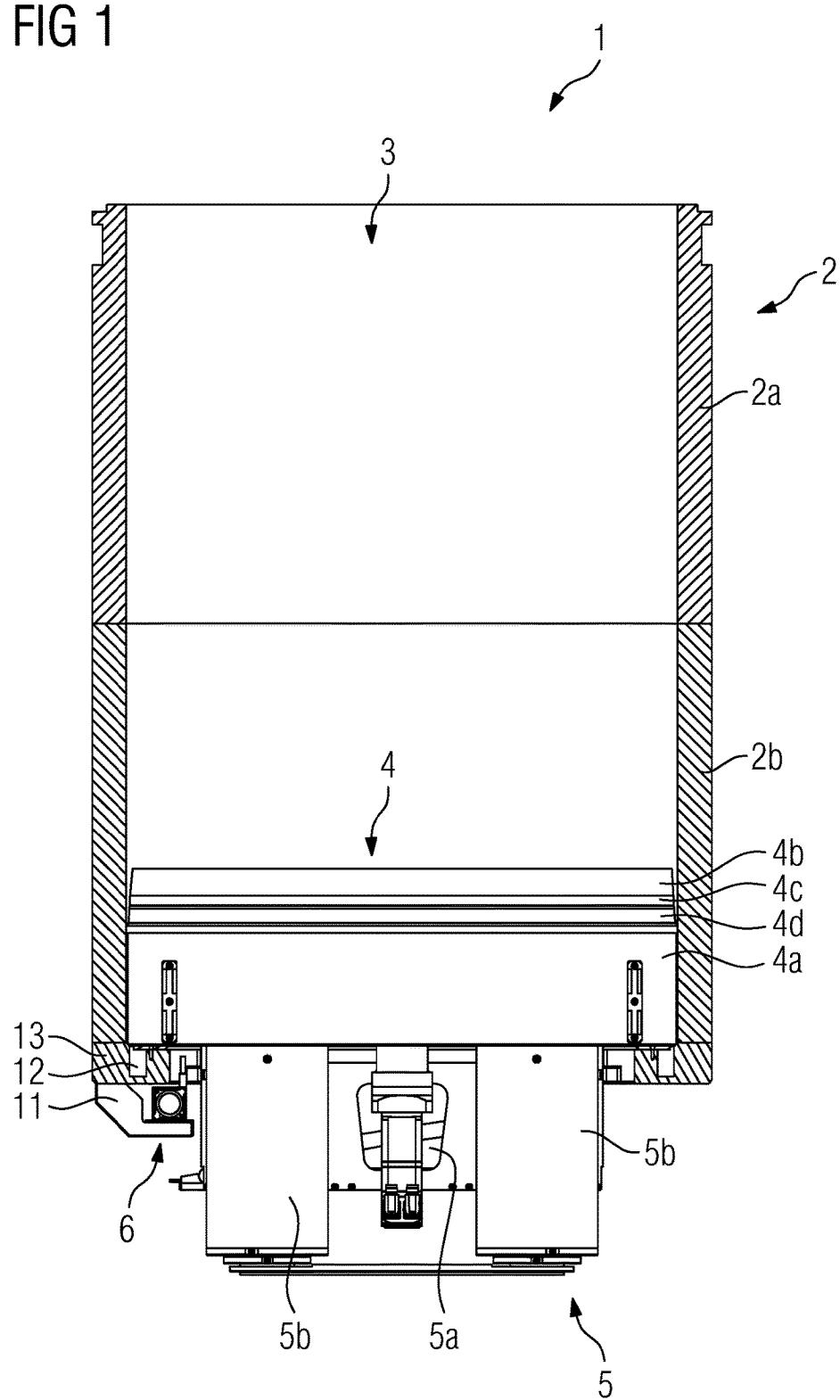
FIG. 1 shows a schematic diagram of a powder module according to an exemplary embodiment.

The powder module 1 represents a functional component of an apparatus (not shown) for additive manufacturing of three-dimensional objects. A respective apparatus is provided for additive manufacturing of at least one object by successive, selective layer-by-layer exposure and thus solidification of individual construction material layers of a construction material (not shown) that can be solidified by means of at least one energy beam (not shown). The construction material that can be solidified can, for example, be metal powder. A metal powder can also mean a powder mixture of different metals. Thus, a metal powder can also be a powder of at least one metal alloy. The energy beam can be a laser beam. The apparatus can be an apparatus for performing selective laser melting methods (SLM methods in short) or selective laser sintering methods (SLS methods in short), i.e. a selective laser melting apparatus (SLM apparatus) or a selective laser sintering apparatus (SLS apparatus).

The powder module 1 can generally be any powder module, which is provided for receiving and/or dispensing construction material. In particular, the powder module 1 can be a construction module in which the actual additive construction of objects is performed and which, for this purpose, is filled with construction material to be solidified in a successive, selective layer-by-layer manner when performing additive manufacturing processes, a metering module via which, when performing additive manufacturing processes, construction material is metered out into a process chamber successively and in layers, or a collector module which, when performing additive manufacturing processes, is filled with construction material that is not solidified. In the exemplary embodiment shown in the Figures, the powder module 1 is a construction module, wherein subsequent explanations are not limited to the design of the powder module 1 as a construction module.

The powder module 1 comprises a powder chamber 2. The powder chamber 2 limits a powder room 3 that can be filled with construction material. The powder room 3 is limited at least on the side by walls (not denoted in more detail) of the powder chamber 2. At the bottom, the powder room 3 is limited by a carrying device 4. The carrying device 4 is typically movably supported between two end positions, i.e. between an upper end position (related to the height of the powder module 1) and a lower end position shown in FIG. 1, relative to the powder chamber 2. The movable support of the carrying device 4 enables the realization of an, especially linear, movement of the carrying device 4 along a vertical movement axis or in a vertical movement direction.

The movable support of the carrying device 4 is realized by an especially (electro) motor operated drive and actuator device 5, comprising e.g. one drive unit 5*a* and two actuator units 5*b*, coupled with said carrying device.

To detect the position of the carrying device 4, the powder module 1 comprises a position detection device 6. The position detection device 6 is provided to detect the position of the carrying device 4. The position of the carrying device 4 can be detected relative to a component of the powder module 1, i.e. especially relative to the powder chamber 2. The position detection device 6 is formed as a cable pull sensor (cable pull length sensor). The use of at least one cable pull sensor to detect the position of the carrying device 4 enables an accurate and reliable detection of the position of the carrying device 4.

Figure 2:
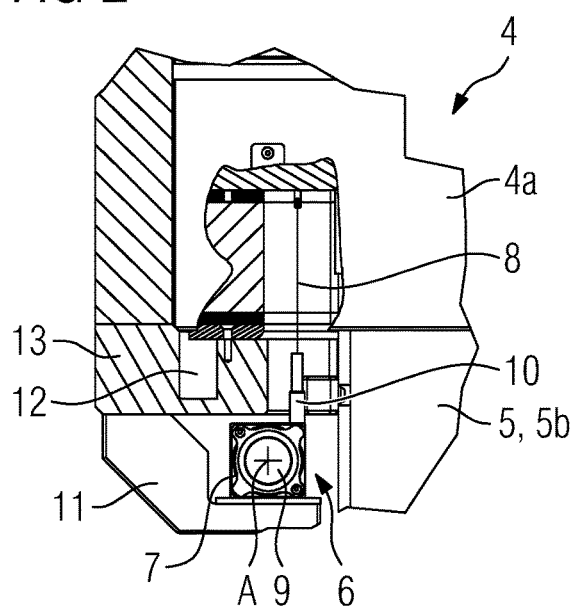
FIG. 2 shows an enlarged illustration of the individual unit C shown in FIG. 1.

From FIG. 2 it can be seen that the cable pull sensor comprises a housing element 7 arranged in a fixed position relative to the powder chamber 2, a cable-like pull-out element 8 ("pull-out cable") that can be coupled or is coupled with the carrying device 4 and a detection device (not shown) provided for the detection of the pull-out length of the pull-out element 8. Movements of the carrying device 4 result in changes of the pull-out length of the pull-out element 8; an, especially linear, movement of the pull-out element 8 coupled with the carrying device 4 that can be traced back to a movement of the carrying device causes a rotational movement of the spooler 9 around a rotational axis A. The detection device detects appropriate rotational movements of the spooler 9. An evaluation unit (not shown) that is implemented by hardware and/or software, consequently an electronic device associated with the detection device is provided to evaluate or convert the detected pull-out length of the pull-out element 8 in terms of a position of the carrying device 4. The evaluation can be performed depending on the specific design of the evaluation unit e.g. (photo)electrically, optically, potentiometrically, etc.

The housing element 7 limits a receiving or interior room (not denoted in more detail), which is provided to receive various functional components of the cable pull sensor. In the receiving room next to the detection unit the spooler 9 is located, on which the pull-out element 8 is attached on one side and from which the pull-out element 8 can be unwound.

The housing element 7 is arranged on one connecting component 11 arranged in the section of a lower end of the powder chamber 2. This is an especially compact and e.g. for the sake of service or repair easily accessible option of the arrangement of the housing element 7, which does not change the dimensions of the powder module 1 relevant for the arrangement of the powder module 1 in an apparatus for additive manufacturing of three-dimensional objects. The connecting component 11 can be an angle element with multiple legs, i.e. e.g. an L-shaped angle element, a first (vertical) leg of which serves for attaching the connecting component 11 to a receiving element 13 arranged to the powder chamber 2, which limits a receiving section provided to receive construction material comprising a flow channel structure 12, and another (horizontal) leg serves for attaching the housing element 7 to the connection component 11. The connecting component 11 can, e.g. by means of a screw fastening, be detachably attached to the receiving element 13 (in a damage-free and non-destructive manner).

From FIG. 2 it can further be seen that the pull-out element 8 is extending beginning from the housing element 7 at first partially (relative to its length) surrounded by at least one sleeve-like or eye-like portion 10 and is then extending exposed between the housing element 7 and the carrying device 4.

The more detailed design of the carrying device 4 can be seen in FIG. 1. The carrying device 4 comprises a table-like base body 4*a* and several plate-like or plate-shaped supporting bodies 4*b*-4*d* arranged on the base body 4*a* in a stack-like manner. The supporting bodies 4*b*-4*d* are functionalized in different ways. Respective supporting bodies 4*b*-4*d* can e.g. be a construction plate 4*b*, a heater 4*c* and a thermal insulating body 4*d*. Between directly adjacent supporting bodies 4*b*-4*d*, sealing elements (not shown) can at least partially be arranged or formed. From FIG. 2 it can be seen that the pull-out element 8 is attached to the base body 4*a*. The pull-out element 8 can e.g. be attached in a form-locked or force-locked manner, i.e. by means of a hook fastening, a clamp fastening, a squeeze fastening or a screw fastening to the base body 4*a*.

Although not shown in the exemplary embodiment shown in the Figures, the position detection device 6 can comprise several cable pull sensors. The provision of several cable pull sensors enables a redundant detection of the position of the carrying device 4 such that position detection is also possible when one cable pull sensor fails. Similarly, by means of several cable pull sensors, possibly undesired changes of the orientation of the carrying device 4, i.e. for example inclinations, can be detected; this would e.g. be the case when different cable pull sensors detect different positions of the carrying device 4. The positions of the carrying device 4 detected by means of respective cable pull sensors can also be evaluated together with the appropriate configuration of the evaluation unit associated with the detection device, e.g. by averaging.

The maximum moving distance (lifting) of the carrying device 4 can be between 800 and 1200 mm, especially between 950 and 1050 mm. The use of appropriate cable pull sensors enables accurate detection of the position of the carrying device 4 even with respectively large liftings.

Appropriately large liftings of the carrying device 4 require a powder chamber 2 that is formed appropriately high. Therefore, the powder chamber 2 or a powder chamber base body (optional) limiting the powder room 3 can be formed segmented into several powder chamber base body segments 2*a*, 2*b* that can be attached or are attached to each other forming the powder chamber base body. By arranging respective powder chamber base body segments 2*a*, 2*b* like stacks, principally powder chambers 2 of any height and hence any heights of construction can be realized. The segmentation of the powder chamber 2 or the powder chamber base body constitutes an optional design of the powder chamber 2, as mentioned.

The invention claimed is:

1. A powder module for an apparatus for additive manufacturing of three- dimensional objects, the powder module comprising:
   a powder chamber defining at least a side portion of a powder room, the powder room capable of being filled with powdered construction material, a carrying device defining at least a bottom portion of the powder room, the carrying device movably supported relative to the powder chamber, and a position detection device comprising a cable pull sensor, the position detection device configured to detect a position of the carrying device.

2. The powder module according to claim 1, wherein the cable pull sensor comprises:

a housing element arranged in a fixed position relative to the powder chamber, a pull-out element that can be or is coupled with the carrying device, and a detection device provided for the detection of a pull-out length of the pull-out element.

3. The powder module according to claim 2, comprising: a connecting component arranged or formed at a section of a lower end of the powder module, the housing element being arranged or formed on the connecting component.

4. The powder module according to claim 3, wherein at a first position the pull-out element extends at least partially exposed and/or at least partially surrounded by at least one sleeve-like portion or eye-like portion, and at a second position the pull-out element extends at least partially exposed between the housing element and the carrying device.

5. The powder module according to claim 3, wherein the detection device comprises an electronic evaluation unit.

6. The powder module according to claim 1, wherein the carrying device comprises:

a base body; and one or more supporting bodies arranged or formed on the base body.

7. The powder module according to claim 1, wherein the position detection device comprises a plurality of cable pull sensors.

8. The powder module according to claim 1, wherein the carrying device is movably supported along a vertical movement axis.

9. The powder module according to claim 1, wherein the carrying device comprises a moving distance of from 800 mm to 1200 mm.

10. The powder module according to claim 1, wherein the powder chamber comprises:

a powder chamber base body comprising a plurality of powder chamber base body segments, the plurality of powder chamber base body segments being attachable or attached to one another.

11. An apparatus for additive manufacturing of three-dimensional objects, the apparatus having at least one powder module comprising:

a powder chamber defining at least a side portion of a powder room, the powder room capable of being filled with powdered construction material, a carrying device defining at least a bottom portion of the powder room, the carrying device movably supported relative to the powder chamber, and a position detection device comprising a cable pull sensor, the position detection device configured to detect a position of the carrying device.

12. The powder module according to claim 11, wherein the cable pull sensor comprises:

a housing element arranged in a fixed position relative to the powder chamber, a pull-out element that can be or is coupled with the carrying device, and a detection device provided for the detection of a pull-out length of the pull-out element.

13. The powder module according to claim 12, comprising:

a connecting component arranged or formed at a section of a lower end of the powder module, the housing element being arranged or formed on the connecting component.

14. The powder module according to claim 2, comprising:

a connecting component arranged or formed at a section of a lower end of the powder chamber, the housing element being arranged or formed on the connecting component.

15. The powder module according to claim 1, wherein the carrying device comprises a moving distance of from 950 mm to 1050 mm.

16. The powder module according to claim 1, wherein the powder chamber comprises:

a powder chamber base body, the powder chamber base body defining at least a portion of the powder room, wherein the powder chamber base body comprises a plurality of powder chamber base body segments, respective ones of the plurality of the plurality of powder chamber base body segments configured to be stacked and attached one on top of another.

17. A powder module for an apparatus for additive manufacturing of three- dimensional objects, the powder module comprising:

a powder chamber defining at least a side portion of a powder room;

a carrying device defining at least a bottom portion of the powder room, the carrying device movably supported relative to the powder chamber; and a cable pull sensor configured to detect a position of the carrying device, the cable pull sensor comprising:

a housing element arranged in a fixed position relative to the powder chamber;

a spooler disposed within the housing element;

a pull-out cable having a first portion coupled to the spooler and a second portion coupled to the carrying device, the spooler exhibiting rotational movement corresponding to movement of the carrying device augmenting a pull-out length of the pull-out cable;

and a detection device configured to determine rotational movement of the spooler.

18. The powder module according to claim 17, comprising:

an evaluation unit configured to determine a position of the carrying device based at least in part on rotational movement of the spooler having been detected by the detection device.

19. The powder module according to claim 17, wherein the housing element is located at a bottom portion of the powered chamber.

20. The powder module according to claim 17, wherein the detection device is configured to determine rotational movement of the spooler (photo)electrically, optically, or potentiometrically.

* * * * *